United States Patent
Grumer et al.

(10) Patent No.: US 10,138,948 B2
(45) Date of Patent: Nov. 27, 2018

(54) DISK FOR A FRICTION CLUTCH

(71) Applicant: Schaeffler Technologies AG & Co. KG, Herzogenaurach (DE)

(72) Inventors: Friedericke Grumer, Achern (DE); Christoph Raber, Ottweiler-Steinbach (DE); Jasmin Moser, Buehlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 485 days.

(21) Appl. No.: 14/888,035

(22) PCT Filed: Apr. 1, 2014

(86) PCT No.: PCT/DE2014/200152
§ 371 (c)(1),
(2) Date: Oct. 29, 2015

(87) PCT Pub. No.: WO2014/177145
PCT Pub. Date: Nov. 6, 2014

(65) Prior Publication Data
US 2016/0160935 A1    Jun. 9, 2016

(30) Foreign Application Priority Data
Jun. 26, 2013   (DE) .................. 10 2013 212 264

(51) Int. Cl.
*F16D 13/64*    (2006.01)
*F16D 13/52*    (2006.01)
*B62M 17/00*    (2006.01)
*B62K 11/00*    (2006.01)
*F16D 13/69*    (2006.01)

(52) U.S. Cl.
CPC ............ *F16D 13/648* (2013.01); *B62K 11/00* (2013.01); *B62M 17/00* (2013.01); *F16D 13/52* (2013.01); *F16D 13/69* (2013.01)

(58) Field of Classification Search
CPC ....................................................... F16D 13/69
See application file for complete search history.

(56) References Cited

U.S. PATENT DOCUMENTS 1,340,885 A * 5/1920 Fuller ................... F16D 13/648
                                                            192/107 R
2,174,240 A * 9/1939 Glenney ............... F16D 13/648
                                                            192/70.28
(Continued)

FOREIGN PATENT DOCUMENTS

DE      19904136        8/2000
DE      102008062645    6/2010
(Continued)

*Primary Examiner* — Mark A Manley
(74) *Attorney, Agent, or Firm* — Davidson, Davidson & Kappel, LLC

(57) ABSTRACT

A disc (1, 2) for a friction clutch (3), including an annular plate (4, 5) having friction surfaces on both faces (6, 7) and at least one seat (8, 9) for at least one spring (10, 11), wherein the at least one spring is configured to space adjacent discs in a friction clutch by at least one seat, and wherein the at least one spring is integral with the disc. Using the disc proposed here for a friction clutch, it is possible without additional components, or with an integrated use of existing components, to ensure a reliable spacing of the discs relative to one another.

20 Claims, 2 Drawing Sheets

(56) References Cited

U.S. PATENT DOCUMENTS

| | | | | |
|---|---|---|---|---|
| 2,738,864 | A * | 3/1956 | Becker | F16D 13/52 |
| | | | | 192/107 C |
| 4,676,356 | A * | 6/1987 | Beccaris | F16D 13/56 |
| | | | | 192/111.16 |
| 4,958,712 | A * | 9/1990 | Suganuma | F16D 13/52 |
| | | | | 192/113.36 |
| 6,279,709 | B1 | 8/2001 | Orlamuender | |
| 8,640,842 | B2 * | 2/2014 | Degowske | F16D 13/648 |
| | | | | 192/70.19 |
| 2009/0101458 | A1 * | 4/2009 | Strandberg | F16D 55/36 |
| | | | | 188/218 XL |
| 2012/0298463 | A1 * | 11/2012 | Tokumasu | F16D 13/648 |
| | | | | 192/66.3 |

FOREIGN PATENT DOCUMENTS

| | | | |
|---|---|---|---|
| DE | 102009001701 | * | 9/2010 |
| DE | 102010008937 | | 8/2011 |
| GB | 1125052 | * | 1/1967 |

* cited by examiner

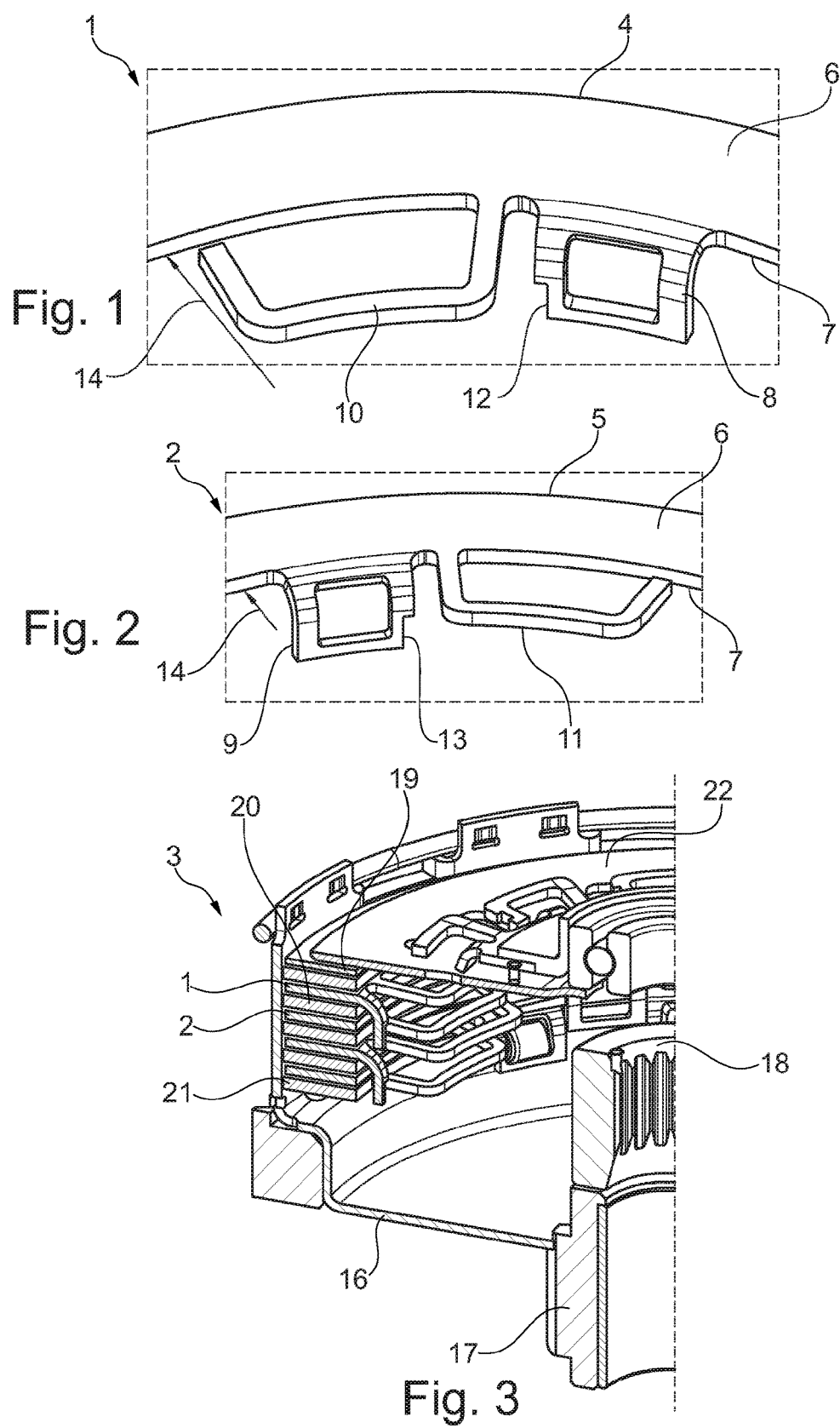

DISK FOR A FRICTION CLUTCH

BACKGROUND

In a friction clutch, discs are pressed against each other with their friction faces to transmit torque. The frictional force allows sufficient torque to be transmitted. Such discs are subdivided into friction discs and retainer plates, which are disposed in an alternating fashion. In most cases, the friction discs are connected to an output shaft via the inner radius and the retainer plates are connected to an input shaft via the outer radius. To prevent the transmission of torque, the pressing force is released, causing the discs to automatically separate from each other. In some friction clutches, the discs do not separate to a sufficient extent, resulting in an undesired transmission of drag torque as a result of continued friction between the discs. On the one hand, this drag torque means stress on the friction faces and, on the other hand, with such a clutch, shifting may be inconvenient and may even require a considerable amount of force. A known solution to this problem is to provide springs between the discs to ensure that there is an even spacing between the discs. A disadvantage of this solution is that the number of parts, in particular of parts that co-rotate, is increased, the friction clutch becomes more complex, and the efficiency of the friction clutch decreases.

SUMMARY OF THE INVENTION

The present invention provides a disc for a friction clutch, comprising an annular plate, the annular plate having friction faces on both sides and at least one seat for at least one spring, wherein the at least one spring is configured to space adjacent discs in a friction clutch by means of the at least one seat. The disc is characterized by the fact that the at least one spring (10, 11) is integral with the disc (1, 2).

The disc described herein in particular is a disc that may be present multiple times in an identical design in a friction clutch. The disc comprises an annular plate with friction faces on both sides. The friction faces are configured to transmit torque corresponding to the frictional force multiplied by the mean radius of the annular plate where the frictional force for each pair of friction faces corresponds to the pressing force multiplied by the respective friction coefficient. The disc comprises a seat for receiving a spring towards an adjacent disc. Thus via the seat, the force of the spring is transmittable to the disc and to the annular plate, respectively. The spring is configured to space adjacent discs apart from each other. This prevents excess drag torque. Such a spring may in particular be designed in the form of a solid body spring and/or of a leaf spring. Advantages of such a disc design are that no additional components need to be inserted when the clutch is assembled and that the springs may be positioned with a very high degree of accuracy.

In accordance with an advantageous further embodiment of the disc the at least one spring is designed as an arched torsional bending spring.

Such an arched spring is designed as a solid body spring. Among others, this design has the following advantages: it is automatically positioned precisely in the correct way; it may be made in one piece (from a plate); and it may have a low mass. Moreover, it may be used as a centering aid for adjacent discs by forming a (rough) positioning stop in a circumferential direction In accordance with an advantageous further embodiment of the disc the disc has a plurality of springs respectively arranged in a mirror-symmetric way relative to one another.

Each one of the mirrored springs is rotated through 180° about the radius of the disc. The springs may additionally be bent downward or upward relative to the plane of the friction faces. In a plurality of discs, lugs may be formed on the discs to create a counterstop for the springs and additionally to position the discs in a fixed manner relative to one another (potentially with a small amount of play). The springs may be pre-loaded via these lugs to create the force required to separate the discs. The lugs may simultaneously be configured to transmit torque from the disc to an inner basket of the friction clutch.

In accordance with a further aspect of the invention a friction clutch is proposed for detachably connecting an input shaft with at least one output shaft. The friction clutch comprises a pressure plate, a plurality of discs, at least one retainer plate, and a counterplate.

Such a friction clutch is configured to detachably connect a drive unit with a drive train. In a motorcycle, for instance, a combustion engine is connected to a transmission. To shift the transmission, the friction clutch is configured to sever the connection between the combustion engine and the transmission. The input shaft is connected to the drive unit and the output shaft is connected to the transmission. Thus in a main condition, torque passes from the input shaft to the output shaft. However, a transmission of torque in the opposite direction is also possible, for instance for a drag operation. To actuate the friction clutch, a pressure plate is provided for transmitting a pressing force to the plurality of discs in accordance with the above description and to the counterplate provided in the end. As a result of the pressing force, a frictional force is generated in this disc system. The maximum transmittable torque is calculated by multiplying the frictional force by the mean diameter of the friction faces of the system. The use of the discs configured as described above significantly reduces the total mass of the friction clutch and in particular the total mass of the rotating elements while ensuring a safe spacing when the friction clutch is disengaged.

In accordance with an advantageous further embodiment of the friction clutch, the discs in the friction clutch are of identical construction and may in particular be arranged in the friction clutch so as to be rotated relative to each other.

The use of discs of identical construction is of particular advantage for serial production because the costs of such a friction clutch are greatly reduced. Preferably all discs in the friction clutch are of identical construction. In accordance with a particularly preferred embodiment, the respective discs are arranged to be rotated relative to each other—about the shaft or about an axis of the friction face plane. The springs may in particular be tensioned in a corresponding way between the seats.

In accordance with a further embodiment of the friction clutch, at least one spring of a disc forms a centering element via the corresponding seat of an adjacent disc.

Thus the discs are easy to insert and to position securely. By way of this centering process, the springs may simultaneously be pre-loaded to ensure the required force for reliably separating the discs when the friction clutch is disengaged.

In accordance with a further aspect, the invention proposes a motorcycle including a drive unit with a drive shaft, a drive train, and a friction clutch for detachably connecting the drive shaft with the drive train.

The term motorcycle is understood to include bicycles, tricycles, quad bikes, all-terrain vehicles, or similar vehicles that are driven by a drive unit such as a combustion engine or an electric motor. For a motorbike, for instance, the drive train consists of a transmission and a chain drive or belt drive that drives the rear wheel of the bike, for instance. The power take-off shaft, which transmits torque that comes from the drive unit, is detachably connectable with the drive train via the friction clutch. In modern motorcycles, the torques that are transmitted by the power take-off shaft are very high and need to be transmitted by a friction clutch that is powerful enough to accommodate such torque. In this context, drag torque may be created that makes shifting of the transmission cumbersome. In such a case, the disc described above is useful as it ensures that the individual discs of the friction clutch separate from each other. At the same time, the number of components and in some cases, the mass of the friction clutch is reduced compared to known friction clutches.

The features individually listed may be combined in any desired way that makes sense from a technological point of view and may be enhanced by explanatory features that are included in the description and by details included in the drawings, resulting in further embodiments of the invention.

The invention and the technical field of the invention will be explained in more detail below with reference to the drawings, which illustrate particularly preferred exemplary embodiments but do not limit the invention in any way. It is in particular to be understood that the drawings and in particular the illustrated proportions are only diagrammatic.

BRIEF DESCRIPTION OF THE DRAWINGS

FIG. 1 illustrates a first disc with an integral spring.
FIG. 2 illustrates a second disc with an integral spring.
FIG. 3 illustrates a friction clutch including discs configured as shown in FIGS. 1 and 2.

DETAILED DESCRIPTION

Figure 4:
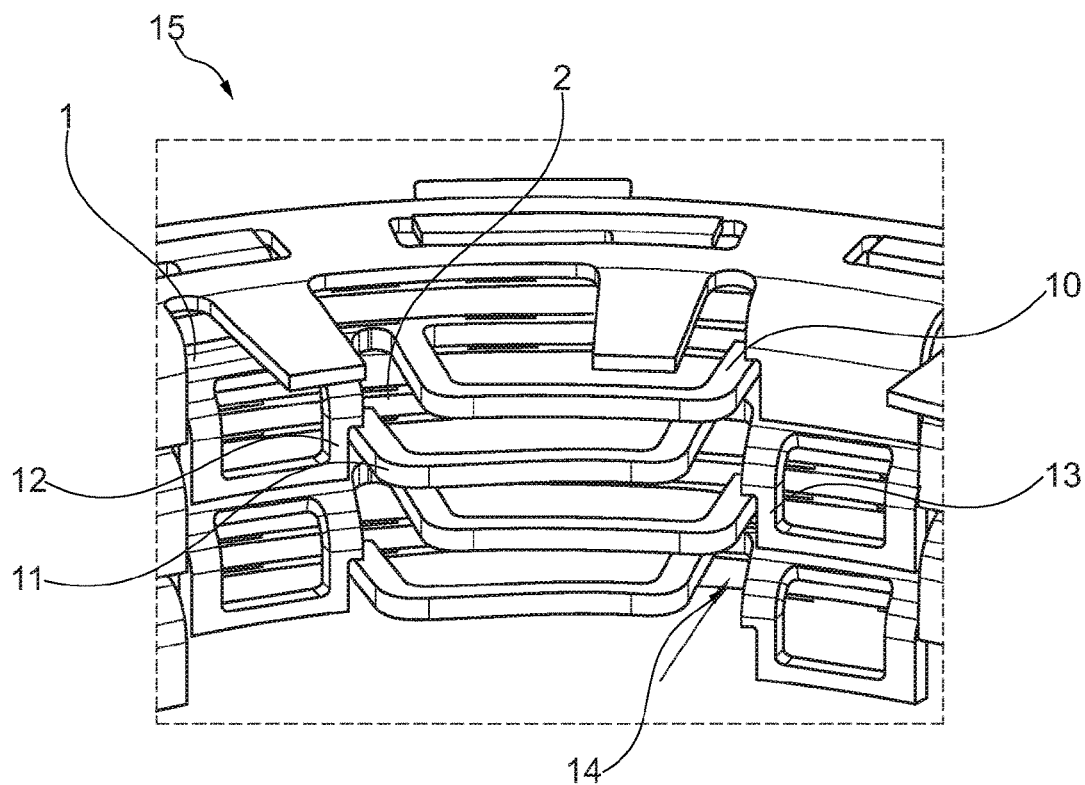
FIG. 4 illustrates a stack of discs of identical construction.

FIG. 1 illustrates a first disc 1 with a first annular plate 4. Annular plate 4 includes a first friction face 6 and a second friction face 7. An integral first spring 10 and a first seat 8 with a first stop 12 are formed on an inner circumference 14 of the first disc 1.

FIG. 2 illustrates a second disc 2 and a second annular plate 5, which likewise have a first friction face 6 and a second friction face 7. A second integral spring 11 and a second seat 9 with a second stop 13 are shown on inner circumference 14 of second disc 2. The arrangement of disc 2 is mirror-symmetric with respect to FIG. 1.

FIG. 3 illustrates a friction clutch 3. Friction clutch 3 includes a first disc 1 and a second disc 2 as shown in FIGS. 1 and 2 and counterdiscs 20 disposed therebetween, underneath a pressure plate 19 and above a counterplate 21. They are pressed together by a diaphragm spring 22. First disc 1 and second disc 2 are connected to an output shaft 18, a fact which is not shown herein. Counterdisc 20 is connected to an input shaft 17 via a clutch basket 16.

FIG. 4 illustrates a stack of discs 15 in which first and second discs 1 and 2 of identical construction are used. First disc 1 and second disc 2 are alternatingly disposed as shown in the sections of FIGS. 1 and 2, i.e. discs 1 with an arrangement as shown in FIG. 1 on their inner circumferences 14 alternating with discs 2 with an arrangement as shown in FIG. 2 on their inner circumferences 14. First spring 10 is pre-loaded by second stop 13 and second spring 11 is pre-loaded by first stop 12.

Figure 5:
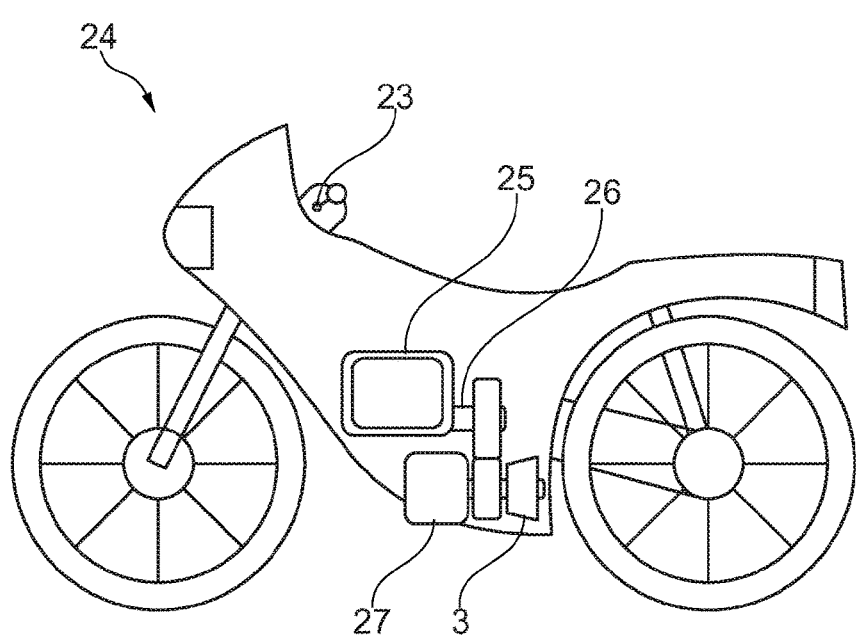
FIG. 5 illustrates a motorcycle with a drive unit and a friction clutch.

FIG. 5 illustrates a motorcycle 24, in particular a motorbike, which includes a drive unit 25 with a power take-off shaft 26. Power take-off shaft 26 is connectable to a drive train 27 via a friction clutch 3. Drive train 27 is illustrated only as a transmission actuated by a manual gear lever 23.

By means of the disc for a friction clutch proposed herein, it is possible to ensure that the discs are reliably spaced apart from each other without additional components, integrally using available components.

LIST OF REFERENCE NUMERALS 1 first disc
2 second disc
3 friction clutch
4 first annular plate
5 second annular plate
6 first friction face
7 second friction face
8 first seat
9 second seat
10 first spring
11 second spring
12 first stop
13 second stop
14 inner circumference
15 stack of discs
16 clutch basket
17 input shaft
18 output shaft
19 pressure plate
20 counterdisc
21 counterplate
22 diaphragm spring
23 manual gear lever
24 motorcycle
25 drive unit
26 power take-off shaft
27 drive train

What is claimed is:

1. A disc for a friction clutch comprising:
an annular plate with friction faces on both sides,
at least one spring; and
at least one seat the at least one spring configured to space an adjacent disc in the friction clutch via contacting at least one further seat of the adjacent disc and the at least one seat configured to space the adjacent disc in the friction clutch via contacting at least one further spring of the adjacent disc, wherein the at least one spring and the at least one seat are formed of a same piece of material as the annular plate, the at least one spring having a connection to the annular plate and extending radially away from the connection and circumferentially with respect to the connection, the at least one seat extending axially away from the annular plate.

2. The disc recited in claim 1 wherein the at least one spring is an arched torsional bending spring extending circumferentially with respect to the annular plate.

3. The disc as recited in claim 1 wherein the at least one spring includes two springs mirror-symmetric relative to each other.

4. A friction clutch for detachably connecting an input shaft with at least one output shaft, the friction clutch comprising:
a pressure plate;
a plurality of discs, each of the plurality of discs as recited in claim 1;

at least one retainer plate; and
a counterplate.

5. The friction clutch recited in claim 4 wherein the discs are of identical construction.

6. The friction clutch as recited in claim 5 wherein the discs are rotationally offset relative to one another.

7. The friction clutch as recited in claim 4 wherein the at least one spring of one of the plurality of discs forms a centering element via a corresponding stop of an adjacent disc of the plurality of discs.

8. A motorcycle comprising:
a drive unit with a drive shaft;
a drive train; and
the friction clutch as recited in claim 4 for detachably connecting the drive shaft with the drive train.

9. The disc as recited in claim 3 wherein the two springs include a first spring extending circumferentially with respect to the annular plate in a first circumferential direction and a second spring extending circumferentially with respect to the annular plate in a second circumferential direction opposite the first circumferential direction.

10. The disc as recited in claim 1 wherein the at least one seat and the at least one spring are fixed to an inner circumference of the annular plate.

11. The disc as recited in claim 1 wherein the at least one spring includes a first portion fixed to and extending radially away from the annular plate, a second portion extending circumferentially away from the first portion and a third portion extending radially away from the second portion toward the annular plate.

12. The disc as recited in claim 11 wherein the third portion forms a free end of the at least one spring.

13. A friction clutch for detachably connecting an input shaft with at least one output shaft, the friction clutch comprising:
a pressure plate;
a plurality of discs, each of the plurality of discs being as recited in claim 1;
a plurality of adjacent discs interleaved with the plurality of discs, each of the plurality of adjacent discs including a respective spring and seat that are mirror symmetric with the at least one spring and the at least one seat, respectively;
at least one retainer plate; and
a counterplate.

14. A friction clutch for detachably connecting an input shaft with at least one output shaft, the friction clutch comprising: a pressure plate; at least one retainer plate; a counterplate; a first friction disc including a first annular plate with first friction faces on both axial sides, a first spring and a first seat, the first spring having a first connection to the first annular plate and extending radially away from the first connection and circumferentially with respect to the first connection, the first seat extending axially away from the first annular plate, the first spring and the first seat being formed of a same piece of material as the first annular plate; and a second friction disc including a second annular plate with second friction faces on both axial sides, a second spring and a second seat, the second spring having a second connection to the second annular plate and extending radially away from the second connection and circumferentially with respect to the second connection, the second seat extending axially away from the second annular plate, the second spring and the second seat being formed of a same piece of material as the second annular plate, the second spring configured to space the second friction disc from the first friction disc in the friction clutch via contacting the first seat.

15. The friction clutch recited in claim 14 wherein the first and second friction discs are of identical construction.

16. The friction clutch as recited in claim 14 wherein the first and second friction discs are rotationally offset relative to one another.

17. The friction clutch as recited in claim 14 further comprising a third friction disc including a third annular plate with third friction faces on both axial sides, a third spring and a third seat, the third spring and the third seat being formed of a same piece of material as the third annular plate, the second seat extending axially away from the second annular plate, the third spring configured to space the third friction disc from the second friction disc in the friction clutch via contacting the second seat.

18. The friction clutch as recited in claim 17 wherein the third spring extends radially away from and circumferentially with respect to the third annular plate.

19. The friction clutch as recited in claim 18 wherein the first spring extends radially away from an inner circumference of the first annular plate, the second spring extends radially away from an inner circumference of the second annular plate and the third spring radially away from an inner circumference of the third annular plate.

20. The friction clutch as recited in claim 18 wherein the third seat extends axially away from the third annular plate.

* * * * *